United States Patent [19]

Kowallik et al.

[11] 3,860,671

[45] Jan. 14, 1975

[54] POLYAMIDE FIBERS WITH IMPROVED ANTISTATIC EFFECT AND THEIR PREPARATION

[75] Inventors: Joachim Kowallik, Aschaffenburg; Erich Kessler, Hoechst, both of Germany

[73] Assignee: Akzona Incorporated, Ashville, N.C.

[22] Filed: Mar. 22, 1974

[21] Appl. No.: 453,766

[30] Foreign Application Priority Data

Mar. 29, 1973 Germany............................ 2315681

[52] U.S. Cl............ 260/858, 260/78 R, 260/482 B, 260/857 PG, 264/210 F
[51] Int. Cl............................................. C08g 41/04
[58] Field of Search .......... 260/857 PE, 858, 482 B

[56] References Cited
UNITED STATES PATENTS

| | | | |
|---|---|---|---|
| 3,428,710 | 2/1969 | Daumiller | 260/857 |
| 3,441,588 | 4/1969 | Wagner | 260/482 B |
| 3,631,199 | 12/1971 | Smith | 260/482 B |
| 3,655,821 | 4/1972 | Lofquist | 260/857 PE |
| 3,657,386 | 4/1972 | Weedon | 260/858 |
| 3,741,966 | 6/1973 | Weedon | 260/857 PA |
| 3,810,956 | 5/1974 | Kimura | 260/858 |

FOREIGN PATENTS OR APPLICATIONS 6,509,926   2/1966   Netherlands

*Primary Examiner*—Paul Lieberman
*Assistant Examiner*—Donald P. Walsh
*Attorney, Agent, or Firm*—Johnston, Keil, Thompson & Shurtleff

[57] ABSTRACT

Linear polyamide fibers are prepared by incorporation of about 2 to 5 percent by weight thereof of a polyalkyleneoxide reaction product, i.e., by spinning a polyamide melt in which there has been incorporated an oxyalkylated polyurethaneurea compound characterized by two urethane groups and one carbonyl diamide group as well as the polyether groups derived from poly-1,2-ethylene-oxide or poly-1,2-propyleneoxide. In addition to an increased and more durable antistatic effect, the polyamide fibers exhibit other valuable textile properties.

9 Claims, No Drawings

POLYAMIDE FIBERS WITH IMPROVED ANTISTATIC EFFECT AND THEIR PREPARATION

In general, this invention is directed to a method of producing antistatic polyamide fibers, i.e., filaments, threads, yarns or the like obtained by melt-spinning a linear fiber-forming polyamide as usually characterized by recurring -NHCO- groups in a linear hydrocarbon chain. The improvement of the present invention depends upon the incorporation or admixture of approximately 2 to 5 percent by weight, with reference to the fiber-forming polyamide, of a specific kind of polyalkyleneoxide reaction product.

It has often been recommended that antistatic polyamide fibers be produced by melt spinning a mixture of the fiber-forming polymer with polyalkyleneoxides or their reaction products.

According to the advice of U.S. Pat. No. 2,872,432, a reaction product of polyethylene glycol with polyepoxides imparts to the fibers a durable antistatic effect if this reaction product is mixed into the spinning melt. On the other hand, the fibers produced in this manner are not completely satisfactory, particularly because the mixing component having an antistatic effect forms a second phase in the polyamide and unfavorably influences the handle or "feel" of the fibrous product. Moreover, such fibers have an increased tendency toward pilling.

Polyglycols and polyglycol ethers have been suggested elsewhere as effective components in preparing antistatic polyamide fibers. For example in German Patent published specifications Nos. 1,273,124 and No. 1,286,683, the added polyalkyleneoxide reaction products likewise form a second phase, i.e., this second phase is expressly required for these two known procedures of producing the antistatic product. The polyglycols and polyglycol ethers disclosed in these references are used with molecular weights such that they have good water solubility. This results in a fibrous product wherein after only a first washing, a high proportion of the antistatic component is removed, leaving hollow spaces or washed out portions of the fibers. These hollow spaces do in fact offer a good covering power, but they have the disadvantage that dirt adheres very strongly in the hollow spaces so as to be much more difficult to wash out or separate than is the case with smooth-surfaced fibers. These known fibers also become dirty very easily, i.e., they pick up and hold dirt particles or other impurities much more quickly than would the corresponding smooth-surfaced fibers. Yet another disadvantage of these known antistatic polyamide fibers resides in the fact that the added antistatic component tends to be completely removed in high temperature dyeing so that the antistatic property is retained only for a certain length of time and only in the undyed products, i.e., only before there is a commercially dyed textile product.

To be sure, such temporary antistatic effects are of some value to the industrial customers of the so-called producer yarn, i.e., the undyed yarn used in making up a variety of specialty yarns, threads, fabrics and the like from the initially produced continuous filaments. On the other hand, this represents only a very limited and temporary usefulness of the antistatic effect, and the handle of the filaments or the special hollow effect is not always desirable in the final commercial fiber.

The reflection capacity of polyamides according to German Patent published (laid-open) specification No. 1,286,683 is reported as being 75 percent, while a polyamide mixed with 2 percent of a delusterant exhibits only a 67 percent reflection capacity.

In British Pat. No. 1,154,702, a process for the production of antistatic textile fibers is described wherein a diisocyanate is reacted with polyglycol compounds on the already spun fibers or yarn so as to produce a durable antistatic protection. Polyamide fibers produced according to this process contain all of the antistatically effective substance only on the filamentary surfaces such that the added substance is very easily carried away or removed during use of the fibers, i.e., from the finished textile product, especially in drycleaning or similar treatments. Externally coated and hard bonded preparation are generally disadvantageous, not only on account of their poor resistance to wear and tear but also because they give to the finished textile products produced therefrom a soapy handle which is still present even after several washings with water. Moreover, the fibers become yellow in color.

Polyamide threads which have been treated according to Example 1 of British Pat. No. 1,154,702, show a reflection capacity of 59 percent with a tensile strength of 42 Reiss-km. After irradiation for 48 hours in the so-called Xeno test, the breaking strength of the threads declines to 19 Reiss-km. Similar results are obtained if the polyamide threads are treated as described in Example 7 of this same patent. In wearing textile articles produced from threads treated in this way, it will be found that irritation of the skin occurs quite frequently and very strongly. Such discomfort, aside from medical problems, rules out any use of the treated fibers for clothing or a similar utility.

One object of the present invention is to provide a permanent antistatic effect in polyamide fibers and textile products which is of improved effectiveness and which is resistant to the usual aftertreatments of such fibers, for example dyeing, boiling, drycleaning and the like. It is also an object of the invention to achieve such fibers by addition of a particular polyalkyleneoxide reaction product as the antistatic agent in small amounts to the spinning melt of the polyamide so as to achieve a single phase homogeneous mixture from which the antistatic agent cannot be removed by water or organic solvents as commonly used in washing and drycleaning. These and other objects and advantages of the invention will become more apparent upon consideration of the following detailed specification.

It has now been found, in accordance with the invention that an improved and more durable antistatic effect can be achieved with polyamide fibers provided that there is uniformly admixed with the initial fiber-forming linear polyamide about 2 to 5 percent by weight of a polyalkyleneoxide reaction product which contains both urethane and carbonyl diamide groups in addition to polyether groups and the resulting mixture is then melt spun and stretched to form the desired fibrous product having a durable resistance to static electricity.

The strong attachment of the antistatic agent of the present invention is attributed to the carbonyl diamide group of the polyalkyleneoxide reaction product which can form a hydrogen bridge bonding with the polyamide. This results in an especially good resistance to washing and drycleaning. By melt blending or admixing the antistatic with the polyamide melt, one achieves a uniform, single phase, homogeneous mixture from which the antistatic additive cannot be easily removed and does not cause special surface handle or other undesirable changes in fibrous structure.

The essential polyalkyleneoxide products used as antistatic additives for the purposes of the present invention are preferably compounds of the formula

[HO-(CR'H-CH$_2$-O-)$_n$CONH-R-NH-]$_2$ C = O (I)

in which n is an integer of about 20 to 200, preferably 30 to 80, R is a bivalent hydrocarbon radical of preferably about 3 to 15 carbon atoms, there being at least 3 up to 10 carbon atoms extending between the two nitrogen atoms, i.e., between the bonding points, and R' is hydrogen or methyl. Where R is a ring system, i.e., containing aromatic or hydroaromatic rings, the number of carbon atoms lying between the bonding points is to be understood such that the shortest carbon chain between the two nitrogen atoms is at least 3 carbon atoms in length while it is at most 10 carbon atoms in length. Thus, in a bivalent benzene or phenyl radical, the orthoposition is excluded since the meta-position first presents the minimum number of 3 carbon atoms between the bonding points. The upper limit of a carbon chain of 10 carbon atoms is fulfilled for example by the bivalent 4,4'-diphenylethane radical.

The polyalkylene oxide reaction products required as the antistatic additives of the invention, e.g., as represented by formula (I), can be prepared very easily. On the one hand, they can be produced in a two-stage process in which two mols of a diisocyanate are first reacted with one mol of water whereby there is formed the carbonyl diamide group with an approximate doubling of the molecular weight of the diisocyanate reactant. The resulting intermediate product is then reacted with two mols of a polyglycol which is built up of about 20 to 200 polyalkyleneoxide units so as to obtain the reaction product (I) used according to this invention. The polyglycols themselves are readily available compounds and may contain ethylene oxide and/or propylene oxide units, e.g., where R' is hydrogen and/or methyl.

The same polyalkyleneoxide reaction products may also be obtained in a single stage process merely by controlling the reaction temperature while admixing all of the reaction components. Thus, the reaction between water and the diisocyanate takes place at relatively low temperatures and the reaction with the polyalkylene glycol can follow at higher temperatures. Both the single stage and two stage procedures are very easily conducted and do not require elaborate equipment or special procedures beyond moderate heating means.

Likewise, the admixture of the polyalkyleneoxide reaction product (I) with the fiber-forming polyamide can be readily carried out at any stage in the production of a polyamide commonly used in spinning filaments from the melt. For example, the polyalkyleneoxide reaction product can be introduced into the VK-tube before or during the polycondensation reaction forming the polyamide. However, this reaction product (I) can also be added just as well to the dyed or undyed polyamide chips, cuttings or granules which are to be supplied to the spinning head or a spinning grate with melting just prior to spinning into filaments, for example by previously mixing the polyalkyleneoxide reaction product into the polyamide as it is formed into such chips, cuttings or granules. Alternatively, the reaction product (I) can also be admixed directly with the melt in the extruder used for spinning filaments.

The linear fiber-forming polyamide being stabilized by the invention is a well known commercial material such as nylon 6 (polycaprolactum) nylon 6, 6(polyhexamethylene adipamide) or minor variations thereof. These linear polyamides and their production are extensively disclosed in the prior art so that further elaboration is not required here. These polyamides are generally characterized as containing recurring -NHCO- groups in a linear hydrocarbon chain.

The diisocyanates used in the preparation of the polyalkyleneoxide reaction product (I) can be represented by the compound O=C=N-R-N=C=O in which R has the same meaning given above. In general, one can use diisocyanates in which R is any bivalent aliphatic, aromatic or hydroaromatic radical of about 3 to 15 carbon atoms and at least 3 up to 10 carbon atoms extending between the two nitrogen atoms. It is preferable to employ a bivalent hydrocarbon radical, i.e., consisting essentially of carbon and hydrogen atoms, because these compounds usually represent the cheapest and most readily available commercial or industrial diisocyanates. However, the presence of a relatively insignificant inert substituent or bridging atom can be tolerated without departing from the spirit or scope of the invention. Commercially available diisocyanates are commonly provided by manufacturers as well as being set forth in standard texts, especially those devoted to the polyurethane art. All such diisocyanates having the requisite number of carbon atoms can be utilized for purposes of the present invention.

The intermediate obtained by reacting one mol of water with two mols of the diisocyanate can be represented by the compound

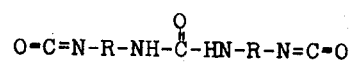

in which R again has the same meaning given above. The terminal isocyanate groups can in turn be reacted at higher temperatures with the polyalkylene glycol HO(CR'H-CH$_2$-O-)$_n$H in which n is preferably 30 to 80 and R' is hydrogen and/or methyl, so as to form the reaction product

[HO-(CR'H-CH$_2$-O-)$_n$CONH-R-NH-]$_2$C = O (I).

n, R and R' having the meanings given above.

One preferred embodiment of the invention is represented by the use of the reaction product (I) in which R is a bivalent hydrocarbon radical of 9 carbon atoms extending between the two nitrogen atoms, e.g., as obtained from diphenylmethane-4,4'-diisocyanate or dicyclohexylmethane-4,4'-diisocyanate wherein R is the radical

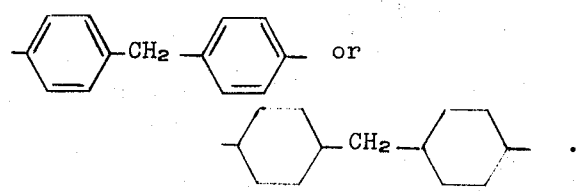

Other especially preferred bivalent radicals R may be listed as follows:

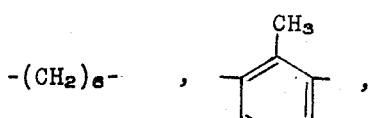 , ,

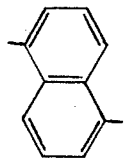

A further especially preferred class of polyalkyleneoxide reaction products according to the invention are represented by the formula

(II)

wherein n is an integer of 20 to 200, preferably 30 to 80, m is an integer of 4 to 6 and R' is hydrogen or methyl. For example, the preferred species in this instance is that in which m is 6, i.e., as derived from hexamethylene diisocyanate wherein R is —$(CH_2)_6$-.

The proportion of the polyalkyleneoxide reaction product added to the fiber-forming polyamide is generally about 2 to 5 percent by weight. Larger amounts do not offer any further improvement of the suppression of electrostatic charges and smaller amounts tend to be less effective so that one will seldom add less than 1 percent by weight. By way of example, polyamide fibers, produced by melt-spinning and stretching in accordance with the invention with the admixture of 3 percent by weight of the reaction product of the polyalkyleneoxide with the intermediate derived from hexamethylene diisocyanate and water, exhibit a definitely improved reflection capacity of 84 percent and an ultimate tensile strength of 43 Reiss-km. The resistance to light and ultraviolet irradiation is proven by the fact that after 4 hours irradiation in the Xeno test, the tensile strength declined to only 38 Reiss-km.

The abbreviation "Reiss-km." stands for Reiss-kilometer or the ultimate tensile strength measured in kilometers as the so-called breaking length, i.e., the length of yarn which breaks under its own weight. This is a well-known useful measurement of tensile strength at the breaking point because it is easily related to the yarn size where denier is the weight of 9,000 meters of yarn and tex is the weight of 1,000 meters of yarn. Thus, dividing this value by 9 gives the more familiar measurement of tensile strength in grams/denier, while dividing by 10 gives the now accepted measurement in grams/dtex, where dtex = 10 (dinier/9). Accordingly, the above-noted tensile strength of 42 Reiss-km. is also equal to 4.2 grams/dtex. This same conversion (dividing by 10) may also be made elsewhere in this specification to convert Reiss-km. into grams/dtex.

While all of the antistatic agents falling within the scope of the present invention as the defined polyalkyleneoxide reaction products are useful to provide a substantially permanent resistance to static electricity, the compounds or reaction products identified as being especially preferred also offer a stabilizing effect against light. This is clearly indicated by the above-described test using the preferred reaction product derived from hexamethylene diisocyanate. This two-fold action of the preferred additives is of special commercial importance.

The polyamide fibers produced according to the invention exhibit a definite reduction of the electrostatic charge in comparison to those polyamide fibers in which there has been incorporated a polyethylene glycol. This truly indicates that there is a synergistic effect in providing one carbonyl diamide group for each two urethane groups in the molecule of the antistatic agent. Moreover, it is relatively certain that the intramolecular hydrogen bonding attributed especially to the carbonyl diamide group is responsible for providing a uniform, homogeneous and fully blended mixture of the antistatic agent of the present invention with the fiber-forming polyamide.

Various methods have been developed for measuring the electrostatic charge on fibers and textiles, all of which tend to be accompanied by certain disadvantages. The method described herein has been chosen for measuring the electrostatic activity of fibers and textiles, and this method does permit a very useful evaluation of any fibrous material with respect to its electrostatic behavior.

In order to measure the electrostatic activity, it is therefore recommended that the polyamide fibers be made into a carpet-like sample of standard size and weave, which is then positioned at a specific distance from the measuring head for the determination of the electrical field strength (using the Schwenkhagen system). The fiber sample is rubbed over 10 times in succession by means of a chrome-plated steel bar, the full width of the bar resting lightly on the sample, e.g., under its own weight, as it is drawn back and forth thereover. After withdrawing the bar, the field strength is measured as kV/m. This measurement takes place not only at the preset distance but also at 20°C. and a relative humidity of 25 percent. Such tests are quite consistent and offer a good comparison as between variously treated or modified polyamide fibers and the corresponding untreated or nonmodified polyamide fibers.

The following tests were carried out by way of example in order to more fully illustrate the present invention, including specific preferred examples of the polyamide fibers of the invention.

First, in carrying out tests with conventional untreated polyamide fibers (nylon 6 or nylon 6,6), it was found that the samples measured as described above exhibited a field strength of about 50 to 150 kV/m. Also, when these same fibers contain 4 percent by weight of polyethylene glycol incorporated therein, they exhibited a field strength of 10 to 20 kV/m.

In the following table, several examples are summarized for the electrostatic effect achieved with the polyamide fibers of the present invention. The amount of polyalkyleneoxide reaction product added to the polyamide was 4 percent by weight in each instance. The chain length of the polyalkyleneoxide portion of the molecule averaged 50 units of ethylene oxide ($n = 50$). Tests with 1,2-propylene oxide units alone or in admixture with ethylene oxide units yield substantially the same result. In the table, a range of variation is given for each sample, between which all of the measured values of field strength were found. The particular yarn used in each carpet sample had a yarn size of dtex 1260 f 64, i.e., 64 filaments in a yarn with a total yarn size of 1260 dtex.

TABLE

| Diisocyanate used to produce the polyalkyleneoxide reaction product and added to nylon during melt-spinning. | Measured value of the electrical field strength kV/m |
|---|---|
| 1. Hexamethylene-diisocyanate | 2 – 4 |
| 2. Toluene-2,4-diisocyanate | 3 – 4 |
| 3. Naphthylene-1,5-diisocyanate | 4 – 5 |
| 4. Diphenylmethane-4,4'-diisocyanate | 2 – 3 |
| 5. Dicyclohexylmethane-4,4'-diisocyanate | 2 – 4 |
| 6. Methylcyclohexyl-2,4-diisocyanate | 4 – 5 |

The polyamide fibers produced in accordance with the present invention can be utilized without limitation in all types of textile products and can be subjected to all of the usual textile processing steps. A reduction or loss of the antistatic effectiveness could not be observed or measured even after various samples of the fibrous products of the invention were subjected to a large number of washing and drycleaning operations or after severe mechanical wear and tear. The handle and appearance of the fibers are excellent, and they maintain good physical properties while preventing an accumulation of electrostatic charges.

The invention is hereby claimed as follows:

1. In a process for the production of linear polyamide fibers, the improvement of imparting an increased antistatic effect to said fibers which comprises:

uniformly admixing with a fiber-forming linear polyamide about 2 to 5 percent by weight of polyalkyleneoxide reaction product of the formula

[HO <CR'H -CH$_2$ -O-><sub>n</sub> CONH-R-NH-]$_2$ C=O

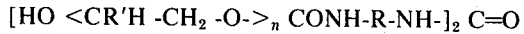

(I)

in which $n$ is an integer of 20 to 200, R is a bivalent hydrocarbon radical having a total of about 3 to 15 carbon atoms with at least 3 up to 10 carbon atoms extending between the two nitrogen atoms, R' is hydrogen or methyl;

melt spinning and stretching the resulting mixture to form a fibrous product exhibiting a durable resistance to static electricity.

2. A process as claimed in claim 1 wherein n in said formula (I) is an integer of 30 to 80.

3. A process as claimed in claim 1 wherein R is a bivalent aromatic or hydroaromatic hydrocarbon radical of 9 carbon atoms extending between the nitrogen atoms.

4. A process as claimed in claim 1 wherein the polyalkyleneoxide reaction product is a compound of the formula

[HO(CR'H-CH$_2$-O-)$_n$CONH-(CH$_2$)$_m$-NH-]$_n$C=O

wherein n is an integer of 20 to 200, m is an integer of 4 to 6 and R' is hydrogen or methyl.

5. An antistatic fiber consisting essentially of (a) a linear polyamide containing recurring —NHCO- groups in a hydrocarbon chain and incorporated therein about 2 to 5 percent by weight of said polyamide of (b) a polyalkyleneoxide reaction product of the formula

[HO(CR'H-CH$_2$-O-)$_n$CONH-R-NH-]$_2$C=O

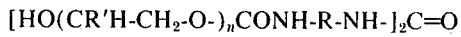

(I)

in which n is an integer of about 20 to 200, R is a bivalent hydrocarbon radical having a total of about 3 to 15 carbon atoms with at least 3 up to 10 carbon atoms extending between the two nitrogen atoms, and R' is hydrogen or methyl.

6. An antistatic fiber as claimed in claim 5 wherein n of formula (I) is an integer of about 30 to 80.

7. An antistatic fiber as claimed in claim 5 wherein R of formula (I) is a bivalent radical selected from the class consisting of

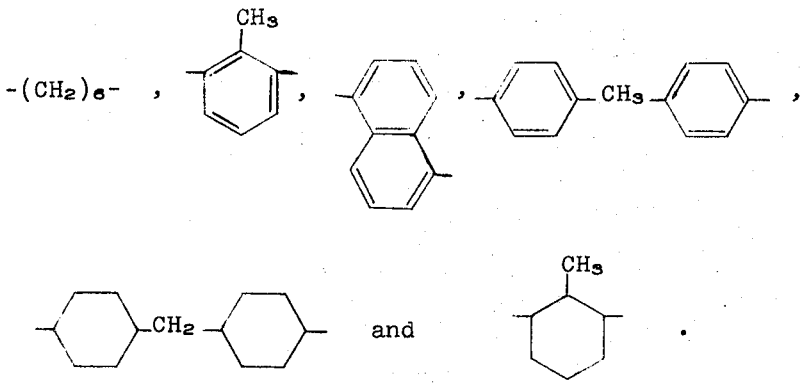

8. An antistatic fiber as claimed in claim 5 wherein said reaction product (b) has the formula

[HO(CR'H-CH$_2$-O-)$_n$CONH-(CH$_2$)$_m$-NH-]$_2$C=O

(II)

wherein n is an integer of about 20 to 200, m is an integer of 4 to 6 and R' is hydrogen or methyl.

9. An antistatic fiber as claimed in claim 8 wherein n is an integer of about 30 to 80 and m is 6.

* * * * *

UNITED STATES PATENT AND TRADEMARK OFFICE
CERTIFICATE OF CORRECTION

PATENT NO. : 3,860,671
DATED : January 14, 1975
INVENTOR(S) : Joachim Kowallik et al It is certified that error appears in the above-identified patent and that said Letters Patent are hereby corrected as shown below:

In Column 7, the formula in Claim 1, delete
" $[HO{<}CR'H-CH_2-O-{>}_n CONH-R-NH-]_2 C=O$ " and substitute -- $[HO (CR'H-CH_2-O-)_n CONH-R-NH-]_2 C=O$ --

Signed and Sealed this

Twenty-sixth Day of October 1976

[SEAL]

Attest:

RUTH C. MASON
Attesting Officer

C. MARSHALL DANN
Commissioner of Patents and Trademarks